(12) United States Patent
Liu et al.

(10) Patent No.: US 11,588,212 B2
(45) Date of Patent: Feb. 21, 2023

(54) CONNECTION ASSEMBLY FOR USE IN BATTERY MODULES AND A BATTERY MODULE

(71) Applicants: Tyco Electronics Japan G.K., Kawasaki (JP); Tyco Electronics (Shanghai) Co., Ltd., Shanghai (CN); Sanyo Electrics Co. Ltd., Osaka-fu (JP)

(72) Inventors: Haifeng Liu, Kanagawa (JP); Litao Dong, Shanghai (CN); Mitsuo Akiyama, Shizuoka (JP); Ziwei Li, Shanghai (CN); Sadamichi Suso, Osaka-fu (JP)

(73) Assignees: SANYO ELECTRICS CO., LTD., Osaka-Fu (JP); TYCO ELECTRONICS (SHANGHAI) CO., LTD., Shanghai (CN); TYCO ELECTRONICS JAPAN G.K., Kawasaki (JP)

( * ) Notice: Subject to any disclaimer, the term of this patent is extended or adjusted under 35 U.S.C. 154(b) by 306 days.

(21) Appl. No.: 16/831,071

(22) Filed: Mar. 26, 2020

(65) Prior Publication Data

US 2020/0313141 A1 Oct. 1, 2020

(30) Foreign Application Priority Data

Mar. 28, 2019 (CN) .......................... 201920413078.4

(51) Int. Cl.
*H01M 50/502* (2021.01)
*H01R 13/506* (2006.01)
(Continued)

(52) U.S. Cl.
CPC ......... *H01M 50/502* (2021.01); *H01M 50/20* (2021.01); *H01R 13/506* (2013.01); *H01R 25/14* (2013.01); *H01M 2220/20* (2013.01)

(58) Field of Classification Search
CPC .............. H01M 50/502; H01M 50/20; H01M 2220/20; H01R 13/506; H01R 25/14; H01R 13/447
See application file for complete search history.

(56) References Cited

U.S. PATENT DOCUMENTS 9,214,752 B2 * 12/2015 Liu .................... H01R 13/447
9,415,909 B2 * 8/2016 Druitt ................ B65D 47/0809

FOREIGN PATENT DOCUMENTS

EP 538573 A2 * 4/1993 ......... B65D 47/0819

* cited by examiner

*Primary Examiner* — Oscar C Jimenez
*Assistant Examiner* — Paul D Baillargeon
(74) *Attorney, Agent, or Firm* — Potomac Law Group, PLLC; Bruce J. Wolstoncroft

(57) ABSTRACT

Disclosed are a connection assembly for a battery module and a battery module. The connection assembly for a battery module has a housing, a first cover plate and a second cover plate, wherein the housing has a body and a protrusion extending continuously from the body; the first cover plate covers the body; the second cover plate is arranged to be integrated with the first cover plate; the second cover plate is configured to be movable relative to the first cover plate so as to be switched between a closed position and an open position; in the closed position, the second cover plate covers the protrusion; and in the open position, the second cover plate is detached from the protrusion. In the connection assembly for a battery module and the battery module provided in the present application, the second cover plate is movable relative to the first cover plate, to facilitate switching between the closed position and the open position, so (Continued)

that the disassembly and assembly processes of the connection assembly and the battery module are simplified. The second cover plate is arranged to be integrated with the first cover plate, so that the quantity of parts of the connection assembly and the battery module is reduced.

21 Claims, 15 Drawing Sheets

(51) Int. Cl.
*H01R 25/14* (2006.01)
*H01M 50/20* (2021.01)

CONNECTION ASSEMBLY FOR USE IN BATTERY MODULES AND A BATTERY MODULE

TECHNICAL FILED

The present application relates to a connection assembly for a battery module, and a battery module.

BACKGROUND

An existing battery module generally comprises cells, a housing, a first cover plate, a second cover plate and a conductive assembly. A plurality of cells are provided and are electrically connected in series or parallel. The housing is arranged on the plurality of cells. The first cover plate and the second cover plate are two separately and independently arranged components and are respectively configured to cover the housing to implement high-voltage protection.

A receiving cavity is defined when the second cover plate covers the housing. The receiving cavity is used for accommodating and mounting the conductive assembly. The conductive assembly needs to be electrically connected inside the receiving cavity. For example, the conductive assembly comprises a positive terminal, a negative terminal, an electrical connection member and a busbar. The busbar is electrically connected to the cells. The positive terminal and the negative terminal need to be electrically connected to the busbar via the electrical connection member. In a specific assembly process, the first cover plate and the second cover plate cover the housing. When the conductive assembly needs to be electrically connected, the second cover plate is disassembled from the housing and the conductive assembly is then electrically connected. Subsequently, the second cover plate and the housing are mounted together again. The first cover plate and the second cover plate are two completely separate members, and the quantity of parts for high-voltage protection is greater. The disassembly and assembly processes of the second cover plate and the housing are complicated.

SUMMARY OF THE INVENTION

One of the objectives of the present application is to provide a connection assembly having a simplified structure for a battery module and a battery module to overcome at least one of deficiencies in the prior art.

According to an aspect of the present application, a connection assembly for a battery module is provided. The connection assembly comprises a housing, a first cover plate and a second cover plate, wherein the housing comprises a body and a protrusion extending continuously from the body; the first cover plate covers the body; the second cover plate is arranged to be integrated with the first cover plate; the second cover plate is configured to be movable relative to the first cover plate so as to be switched between a closed position and an open position; in the closed position, the second cover plate covers the protrusion; and in the open position, the second cover plate is detached from the protrusion.

In some embodiments of the connection assembly described above, the first cover plate is interconnected to the second cover plate via a bendable portion; and the bendable portion is configured to enable the second cover plate to rotate relative to the first cover plate. In an embodiment of the connection assembly, the bendable portion is bent and thus deformed, so that the second cover plate is moved from the closed position to the open position. Additionally or alternatively, the bendable portion is elastically deformed to generate a resilient force, so as to urge the second cover plate to move from the open position to the closed position. In another embodiment of the connection assembly, the bendable portion is sheet-shaped, and the bendable portion has a thickness smaller than that of the first cover plate. In some other embodiments of the connection assembly, an obtuse angle is formed between the second cover plate in the open position and the second cover plate in the closed position. Additionally or alternatively, the second cover plate has a cover plate body and an extension, the extension extending continuously from the cover plate body and protruding beyond the cover plate body to form a free end; and in the open position, the free end of the extension abuts against the protrusion to form a stop. In an alternative embodiment, in the open position, the free end of the extension is arranged to extend beyond the bendable portion. In another alternative embodiment, during the rotation of the second cover plate from the closed position to the open position, when the second cover plate is perpendicular to the first cover plate, the extension abuts against the protrusion. In some other embodiments, the protrusion is provided with a bottom wall and an annular side wall arranged to protrude from the bottom wall, the bottom wall and the annular side wall define an accommodation cavity, and an opening is provided in one side of the accommodation cavity that is away from the bottom wall; and in the closed position, the second cover plate at least partially covers the opening, and the annular side wall forms a stop for the extension. Additionally or alternatively, the second cover plate is rotatable from the open position to the closed position when pushed by an external force. Alternatively, a retaining portion is arranged to protrude from an inner surface of the second cover plate; and in the closed position, the second cover plate covers the opening, and the annular side wall forms a stop for the retaining portion to prevent the second cover plate from moving laterally. In still other embodiments, in the closed position, the second cover plate is connected to the protrusion in a snap-fitted manner to prevent the second cover plate from being detached from the housing. Additionally or alternatively, a first snap fastener is arranged on an outer surface of the protrusion; the second cover plate is protrudingly provided with a snap-fit arm, and the snap-fit arm is provided with a second snap fastener; in the open position, the first snap fastener is detached from the second snap fastener; and in the closed position, the snap-fit arm is located on one side of the housing, and the first snap fastener is snap-fitted with the second snap fastener to prevent the second cover plate from being detached from the protrusion.

In other embodiments of the connection assembly described above, the first cover plate and the second cover plate are integrally molded as a single piece.

According to another aspect of the present application, a battery module is provided. The battery module comprises: a plurality of cells; and the connection assembly as described above, wherein the housing is arranged on the plurality of cells; and the plurality of cells are electrically connected via the connection assembly to form the battery module.

In some embodiments, the battery module further comprises a conductive assembly, wherein the conductive assembly is arranged in the housing; the first cover plate covers a part of the conductive assembly in the body; and the second cover plate covers the rest part of the conductive assembly in the protrusion. Additionally or alternatively, the protrusion is provided with an accommodation cavity; in the open position, the second cover plate is detached from the protrusion and the accommodation cavity is opened; and in the closed position, the second cover plate covers the protrusion and covers the accommodation cavity. In another embodiment, the conductive assembly comprises a busbar, the busbar being fixedly supported on the body; and the busbar is electrically connected to the cells. In yet another embodiment, the conductive assembly comprises a power supply terminal and an external connection member; the protrusion is provided with an accommodation cavity; the power supply terminal is arranged in the accommodation cavity and is electrically connected to the plurality of cells; and the external connection member extends out of the protrusion for electrically connecting the battery module. Additionally or alternatively, the conductive assembly further comprises an electrical connection member; and the power supply terminal is electrically connected to the busbar via the electrical connection member. In some other embodiments, the battery module is a battery module for use in an electric vehicle.

Compared with the prior art, in the connection assembly for a battery module and the battery module provided in embodiments of the present application, a housing comprises a body and a protrusion extending continuously from the body. A first cover plate covers the body, and a second cover plate is movably connected to the first cover plate and can be switched between an open position and a closed position. In the open position, the second cover plate is detached from the protrusion, so that a conductive assembly can be electrically connected in the housing. In the closed position, the second cover plate covers the protrusion, so that the conductive assembly in the housing can be insulated and protected.

The second cover plate is movable relative to the first cover plate to facilitate switching between the closed position and the open position, so that the disassembly and assembly processes of the connection assembly and the battery module are simplified.

The second cover plate is arranged to be integrated with the first cover plate, so that the quantity of parts of the connection assembly and the battery module is reduced.

Exemplary embodiments of the present application will be described below in detail with reference to the accompanying drawings, and further features and advantages of the present application will become clear.

LIST OF NUMERAL REFERENCES

100: battery module; 10: cell; 20: housing; 20A: body; 20B: protrusion; 200: bottom wall; 201: annular side wall; 21: first snap fastener; 27: opening; 28: accommodation cavity; 30: first cover plate; 50: busbar; 55: electrical connection member; 60: power supply terminal; 61: external connection member; 70: second cover plate; 700: inner surface; 71: cover plate body; 72: bendable portion; 74: extension; 75: free end; 76: snap-fit arm; 77: second snap fastener; 78: retaining portion.

DETAILED DESCRIPTION OF EMBODIMENTS

The application will be further explained below in detail with reference to the accompanying drawings.

Figure 1:
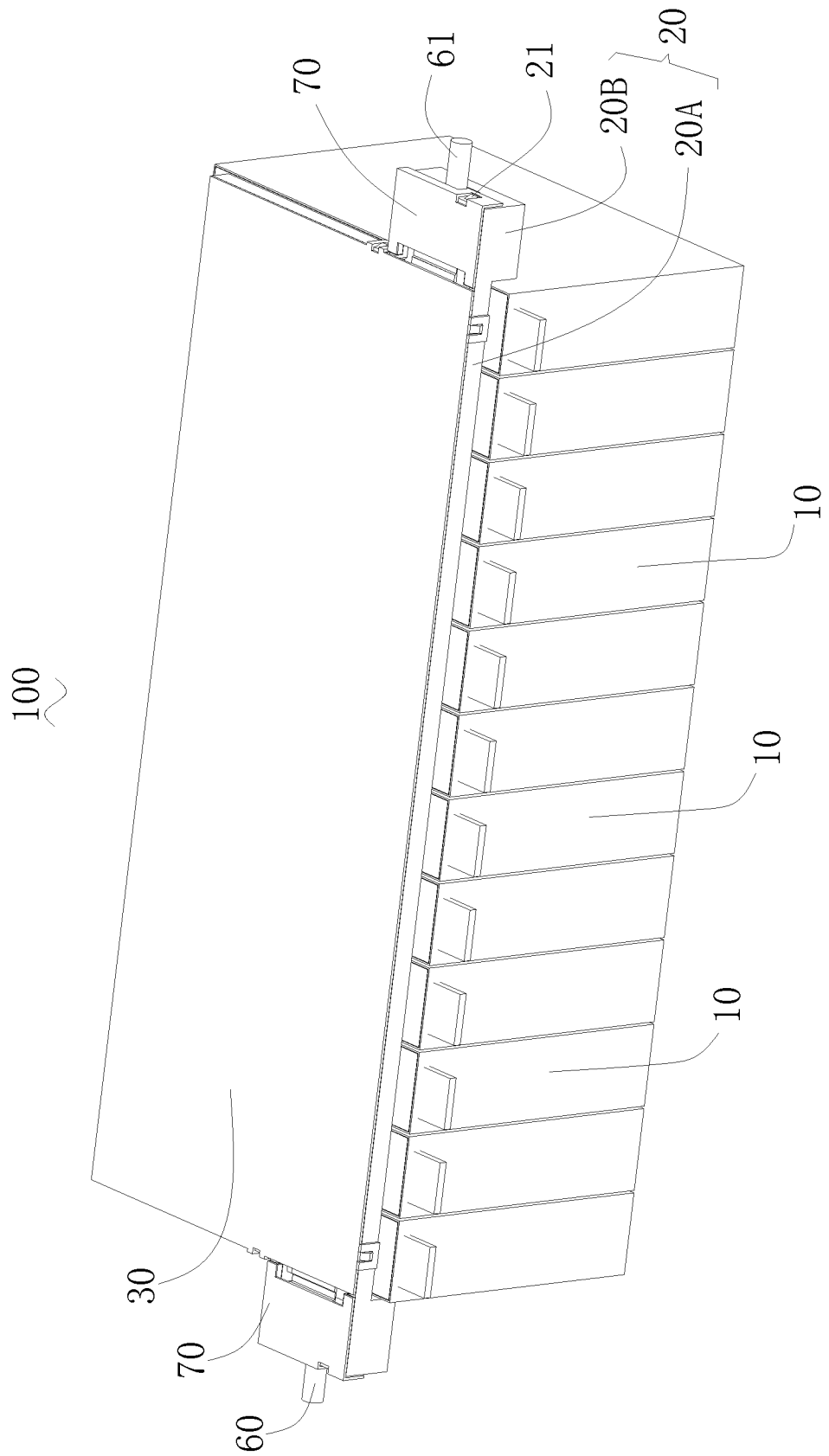
FIG. 1 is a schematic structural diagram of a battery module according to an embodiment of the present application.
Figure 2:
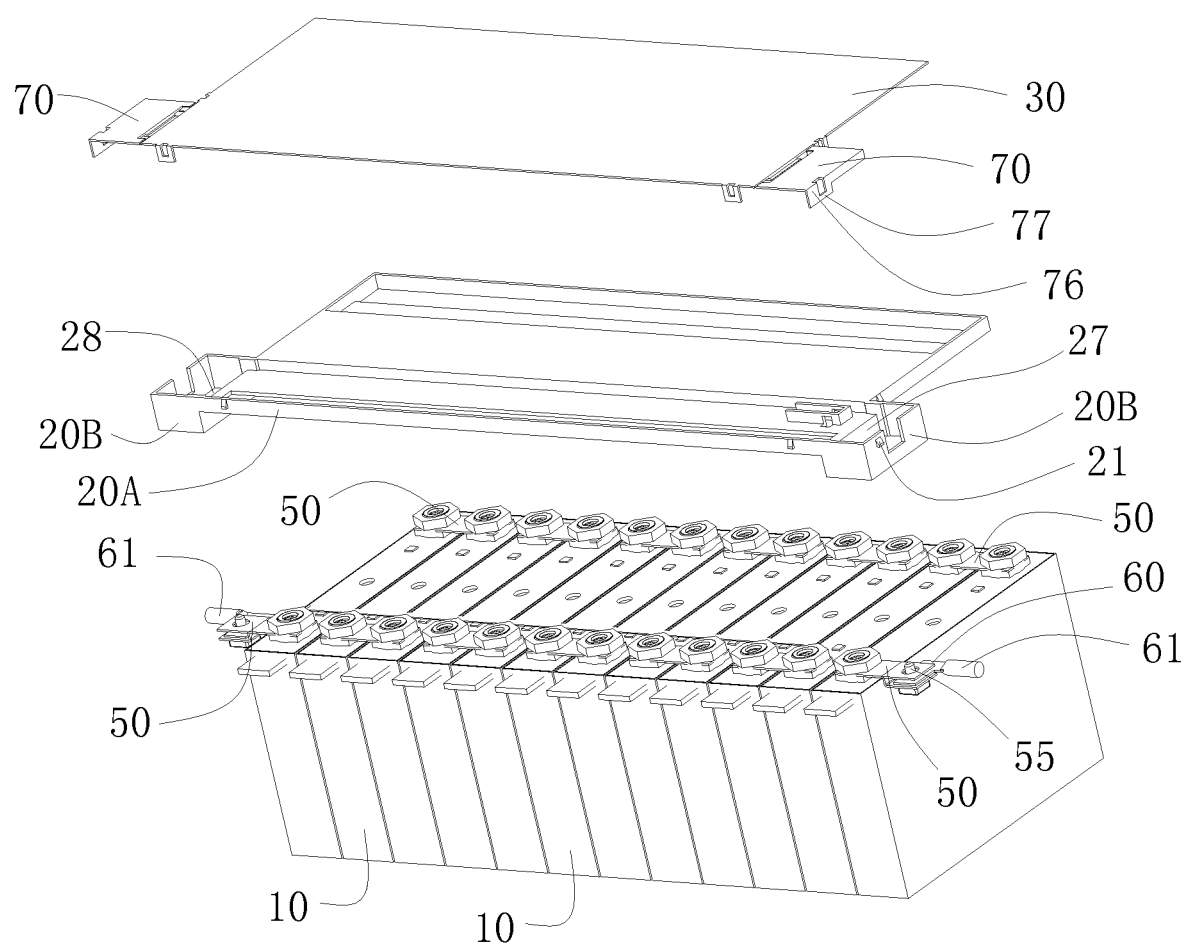
FIG. 2 is an exploded view of parts of the battery module in FIG. 1.

FIG. 1 and FIG. 2 show a battery module 100 according to an embodiment of the present application. The battery module 100 comprises a connection assembly and a cell 10. A plurality of cells 10 are provided. The plurality of cells 10 are arranged in stack. The plurality of cells 10 are electrically connected via the connection assembly to form the battery module. For example, each of the cells 10 has a positive electrode and a negative electrode. The positive electrode and negative electrode of the cell 10 may be provided with a positive terminal and a negative terminal to be connected with the connection assembly, respectively.

The connection assembly comprises a housing 20, a first cover plate 30 and a second cover plate 70. A conductive assembly is arranged in the housing 20. The housing 20 is arranged on the plurality of cells 10. The housing 20 comprises a body 20A and a protrusion 20B extending continuously from the body 20A. The protrusion 20B defines an accommodation cavity 28. The accommodation cavity 28 has an opening 27 for connecting to the outside.

The first cover plate 30 may cover the body 20A of the housing 20, and may cover a part of the conductive assembly in the body 20A. For example, the first cover plate 30 may be connected to the housing 20 in a snap-fitted manner or other manners. The first cover plate 30 and the housing 20 may define a receiving cavity.

The second cover plate 70 is arranged to be integrated with the first cover plate 30. The first cover plate 30 and the second cover plate 70 are integrally arranged into a cover plate. The cover plate is integrated as a single piece. Preferably, the first cover plate 30 and the second cover plate 70 may be integrally molded as a single piece.

Figure 3:
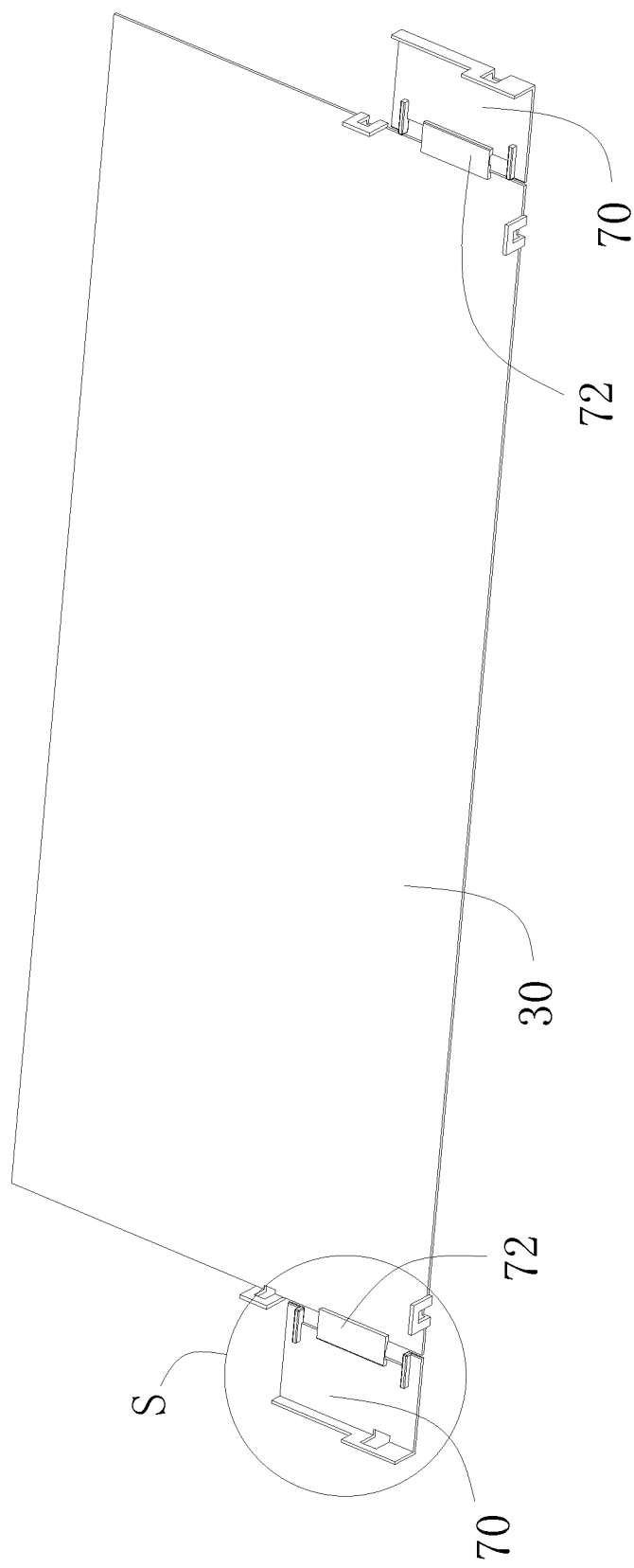
FIG. 3 is a schematic structural diagram, viewed from another angle, of a cover plate in the battery module in FIG. 2.
Figure 4:
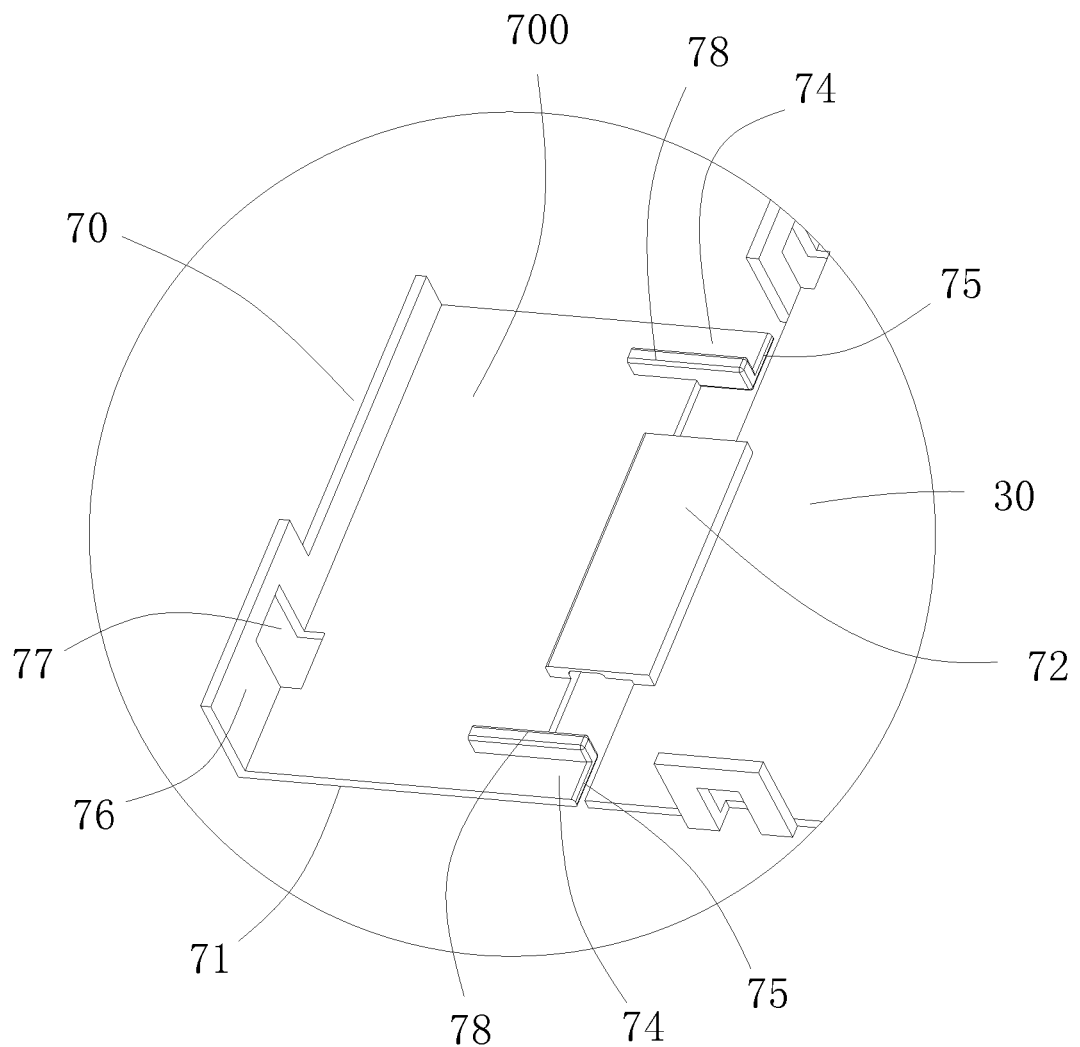
FIG. 4 is an enlarged schematic view at S in FIG. 3.

The second cover plate 70 is movable relative to the first cover plate 30, so that the position of the second cover plate 70 relative to the first cover plate 30 can change correspondingly. Referring to FIG. 3 and FIG. 4, to enable the second cover plate 70 to be movable relative to the first cover plate 30, the first cover plate 30 is interconnected with the second cover plate 70 via a bendable portion 72. One end of the second cover plate 70 is connected to the first cover plate 30 via the bendable portion 72, and the other end thereof is danglingly arranged. For example, the first cover plate 30, the bendable portion 72 and the second cover plate 70 may be integrally molded or integrally arranged by other existing technologies. The bendable portion 72 rotatably connects the first cover plate 30 with the second cover plate 70. The bendable portion 72as deforms at least more easily than the first cover plate 30, to enable the second cover plate 70 to move relative to the first cover plate 30.

In this embodiment, the bendable portion 72 is sheet-shaped. The bendable portion 72 has a thickness smaller than that of the first cover plate 30. Compared with the second cover plate 70 and the first cover plate 30, the bendable portion 72 has a leaf spring-shaped structure with a smaller thickness, and has better elastic deformability. The bendable portion 72 can be bent in a thickness direction thereof and thus elastically deformed, so as to enable the second cover plate 70 to rotate relative to the first cover plate 30.

According to different specific positions of the second cover plate 70 relative to the first cover plate 30, the second cover plate 70 has a closed position and an open position. During movement, the second cover plate 70 can be switched between the closed position and the open position.

Figure 5:
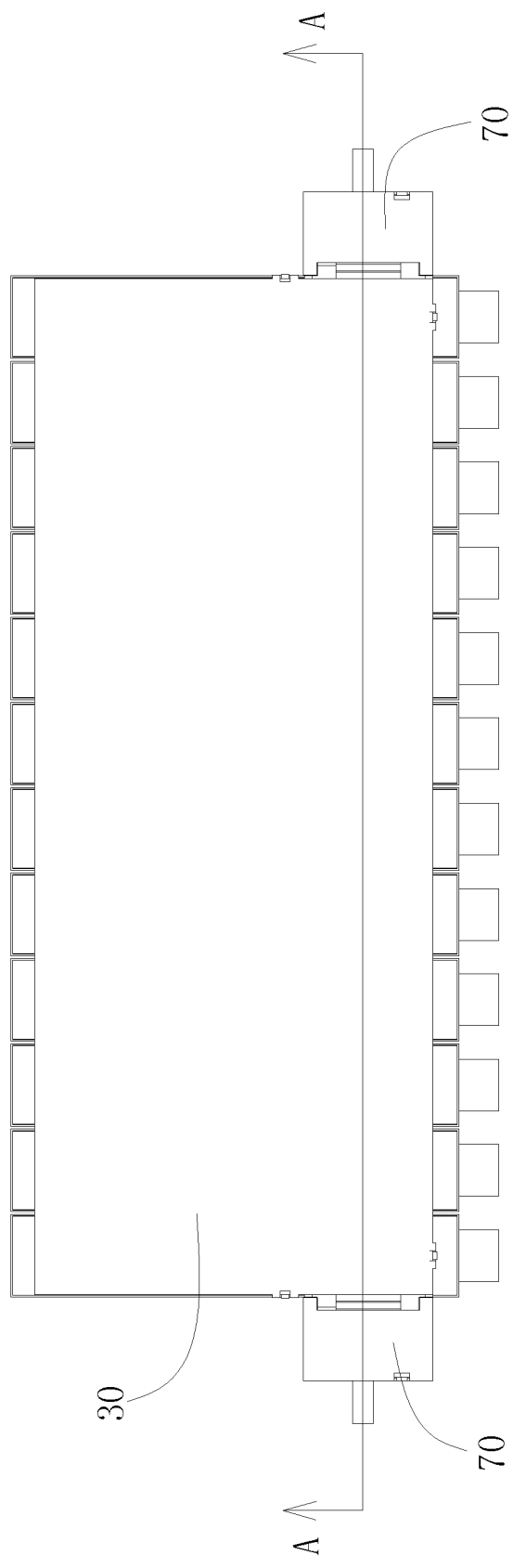
FIG. 5 is a top view of FIG. 1.
Figure 6:
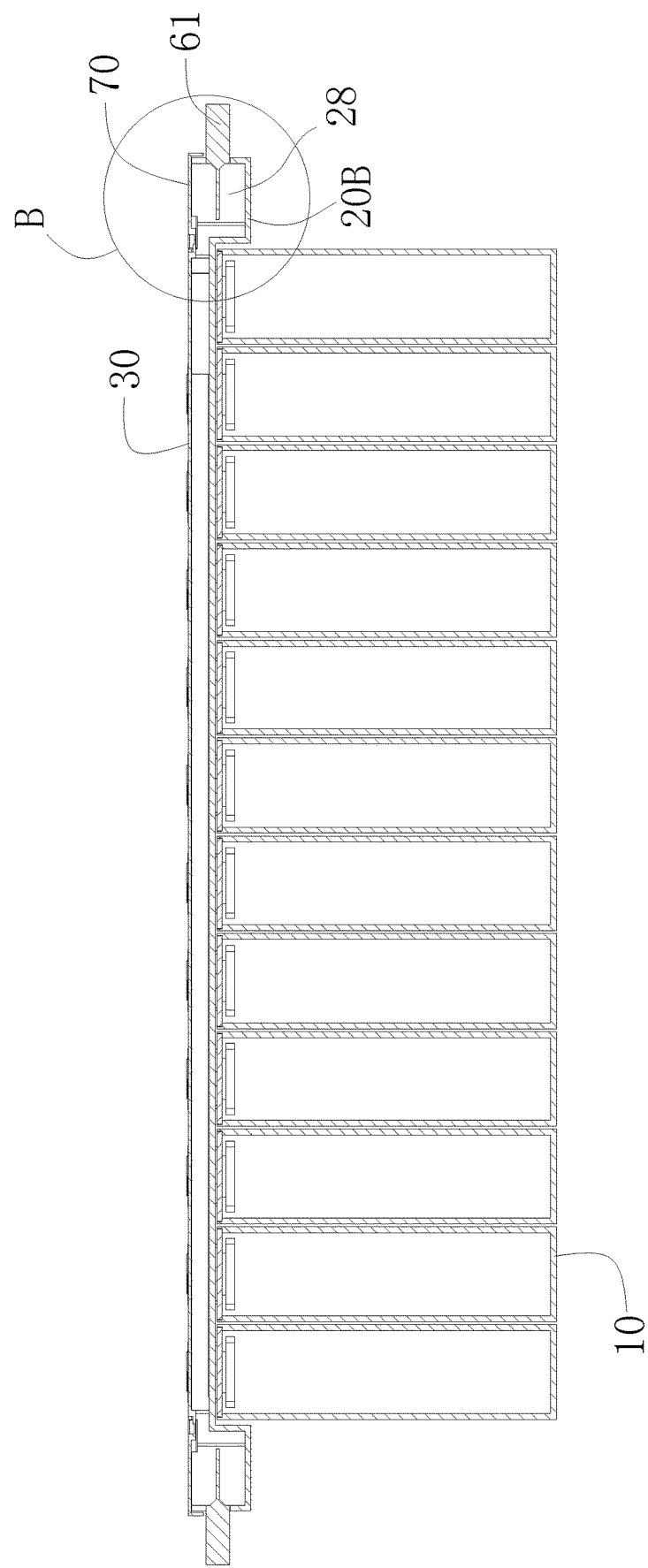
FIG. 6 is a sectional view taken along a direction A-A in FIG. 5.
Figure 7:
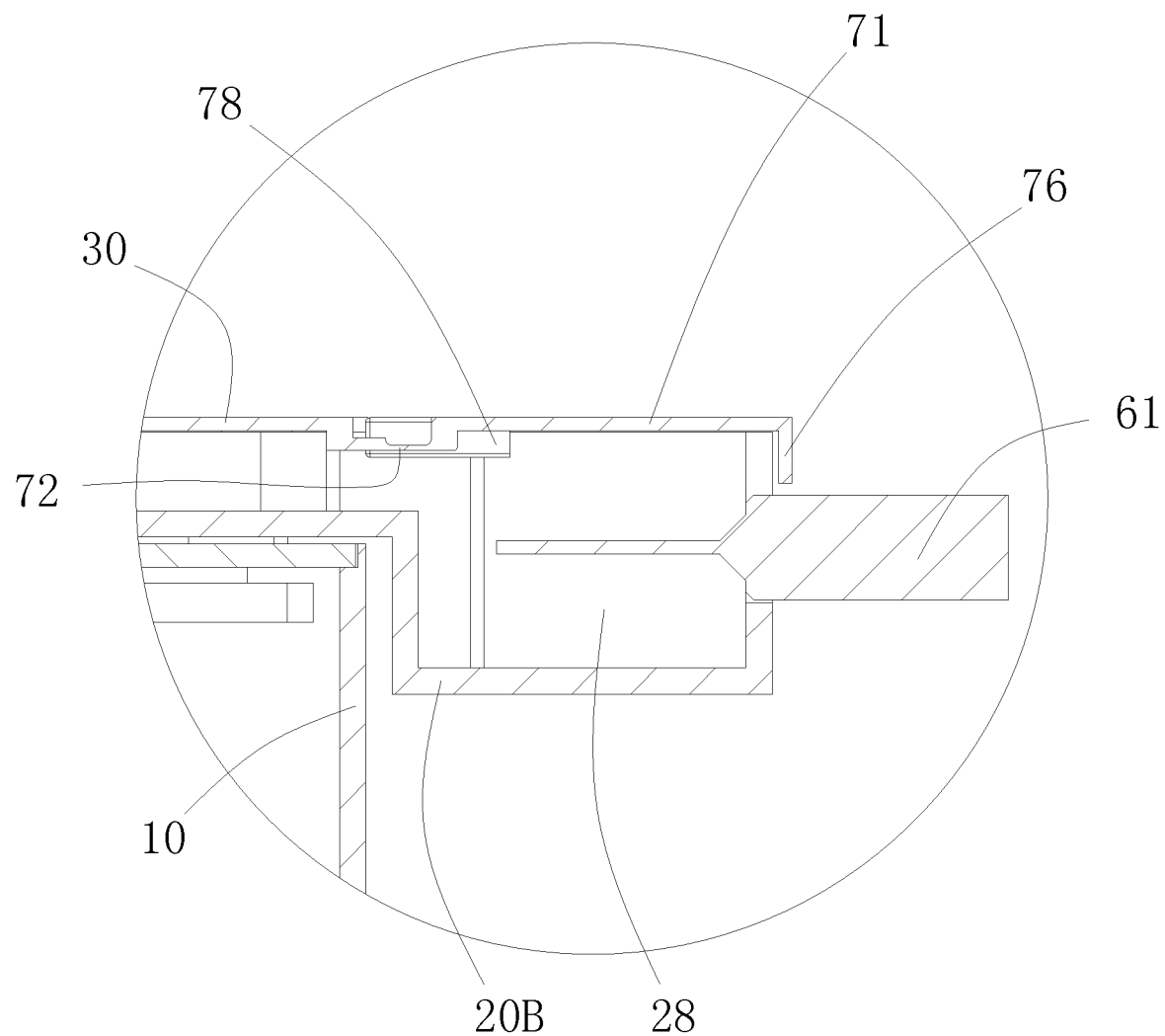
FIG. 7 is an enlarged schematic view at B in FIG. 6.

Referring to FIG. 5 to FIG. 7, when the second cover plate 70 is in the closed position, the second cover plate 70 covers the protrusion 20B, and the second cover plate 70 covers the accommodation cavity 28, and may cover the rest part of the conductive assembly in the protrusion 20B. In this case, the opening 27 is blocked by the second cover plate 70. The second cover plate 70 can insulate the rest part of the conductive assembly in the accommodation cavity 28.

Referring to FIG. 8 to FIG. 11, when the second cover plate 70 is in the open position, the second cover plate 70 is detached from the protrusion 20B to open the accommodation cavity 28. In this case, the opening 27 is not blocked by the second cover plate 70, and may be used for arranging the conductive assembly in the accommodation cavity 28, and may be used for electrically connecting the conductive assembly in the accommodation cavity 28 via the opening 27.

An obtuse angle may be formed between the second cover plate 70 in the open position and the second cover plate 70 in the closed position. During the movement of the second cover plate 70 from the closed position to the open position, the second cover plate 70 is rotated to be perpendicular to the first cover plate 30.

An angle at which the second cover plate 70 is rotatable relative to the first cover plate 30 may be specifically set as required. The quantity of the bendable portions 72 may be set correspondingly based on the angle.

When the second cover plate 70 is in the open position, the bendable portion 72 is in a state of being bent and thus elastically deformed. In this case, an included angle between the second cover plate 70 and the first cover plate 30 may be specifically set as required. In this embodiment, an acute angle may be formed between the second cover plate 70 and the first cover plate 30. The acute angle may be chosen as required.

When the second cover plate 70 is in the closed position, the bendable portion 72 is not deformed and is in a reset state. When the second cover plate 70 is in the closed position, the included angle between the second cover plate 70 and the first cover plate 30 may be specifically set according to a position relationship between the body 20A and the protrusion 20B. For example, the opening 27 may be horizontally arranged, and when the second cover plate 70 is in the closed position, an included angle of 180 degrees may be formed between the second cover plate 70 and the first cover plate 30. For another example, the opening 27 may be arranged to incline towards one side, and when the second cover plate 70 is in the closed position, an included angle of 180 degrees may not be formed between the second cover plate 70 and the first cover plate 30.

An external force is applied to enable the bendable portion 72 to be bent and thus deformed, so that the second cover plate 70 can be moved from the closed position to the open position. When the bendable portion 72 is elastically deformed, a resilient force can be generated. When the applied external force disappears, the resilient force generated by the bendable portion 72 may urge the second cover plate 70 to move from the open position to the closed position.

Figure 8:
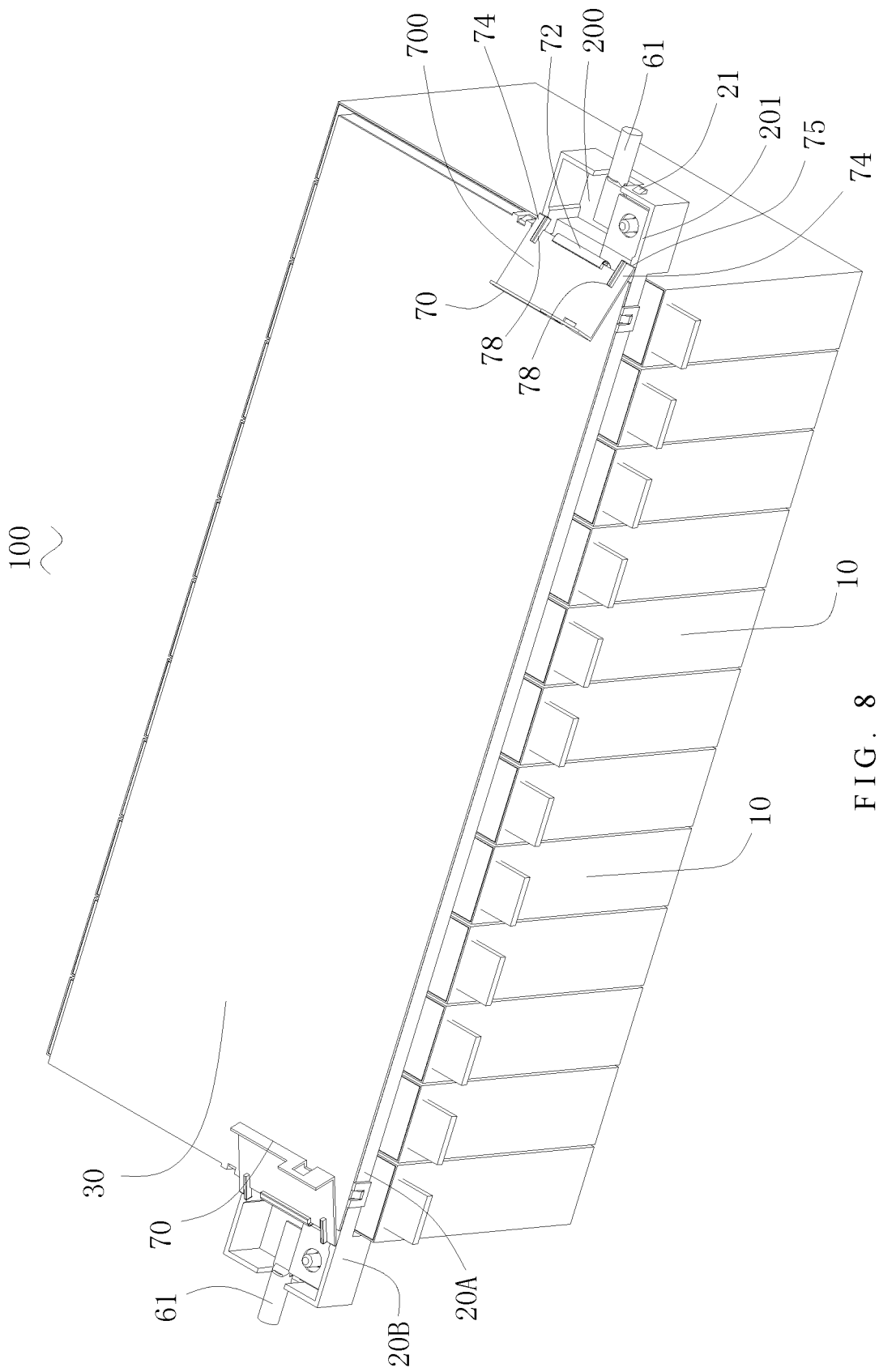
FIG. 8 is an enlarged schematic view with a second cover plate of the battery module in FIG. 1 being in an open position.
Figure 9:
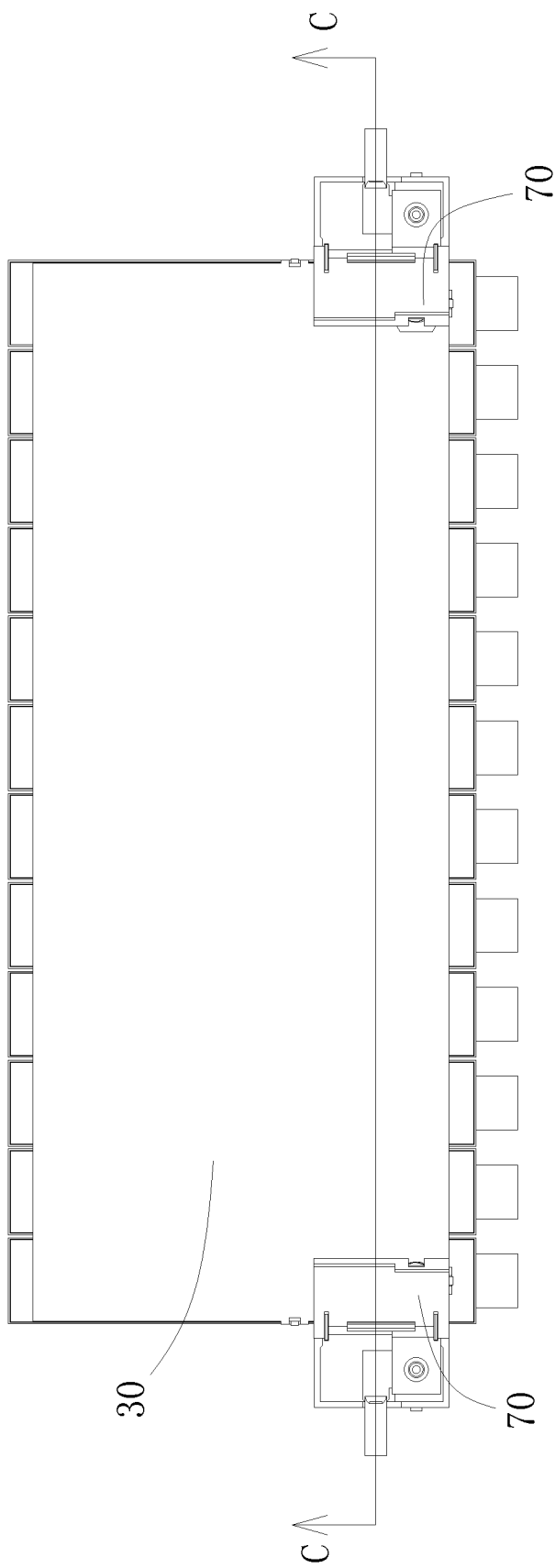
FIG. 9 is a top view of FIG. 8.
Figure 10:
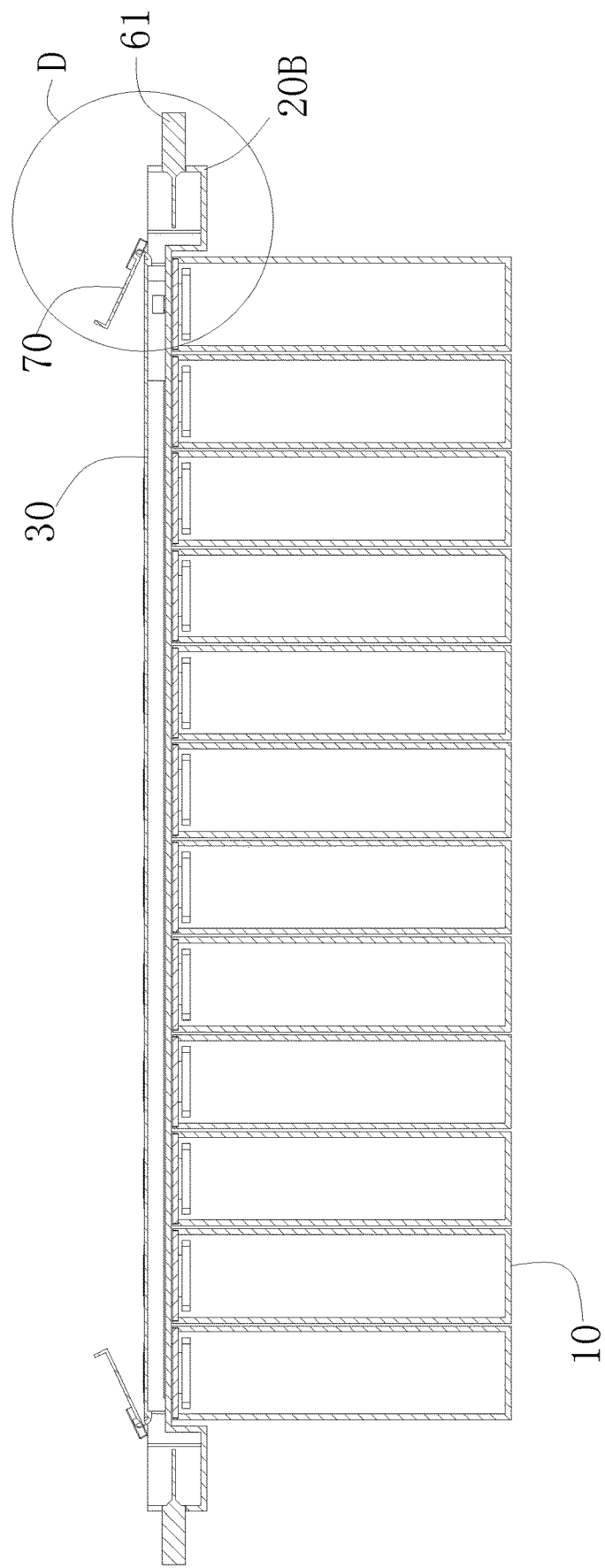
FIG. 10 is a sectional view taken along a direction C-C in FIG. 9.

To prevent the second cover plate 70 from being reset to the closed position from the open position, preferably, the second cover plate 70 has a cover plate body 71 and an extension 74. The extension 74 is arranged to extend continuously from the cover plate body 71 and protrude beyond the cover plate body 71 to form a free end 75 danglingly arranged. As shown in FIG. 8, when the second cover plate 70 is in the open position, the free end 75 of the extension 74 abuts against the protrusion 20B. In this case, the protrusion 20B forms a stop for the extension 74 to overcome the resilient force generated when the bendable portion 72 is elastically deformed, so that the second cover plate 70 is fixed in the open position.

Figure 11:
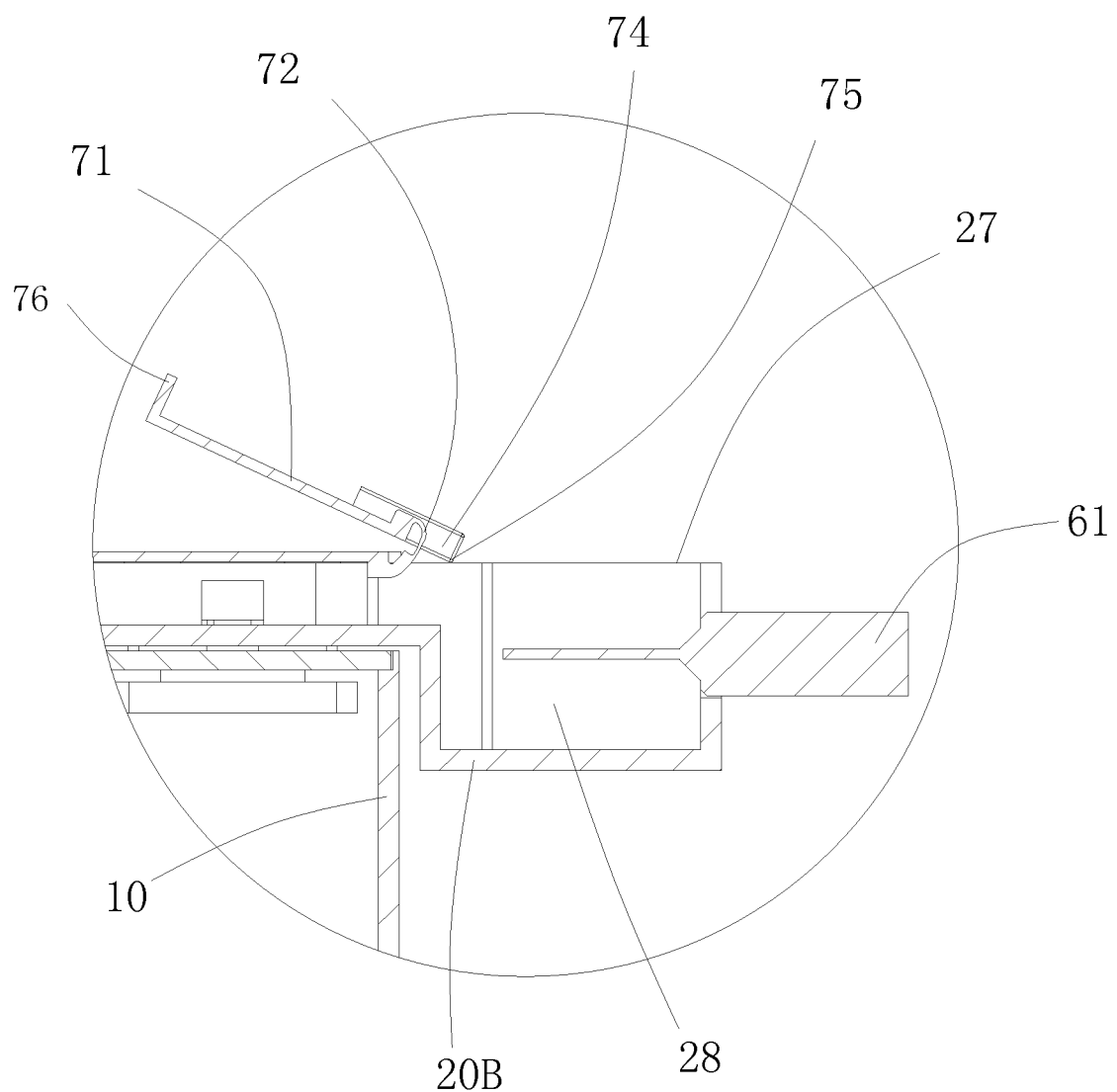
FIG. 11 is an enlarged schematic view at D in FIG. 10.
Figure 12:
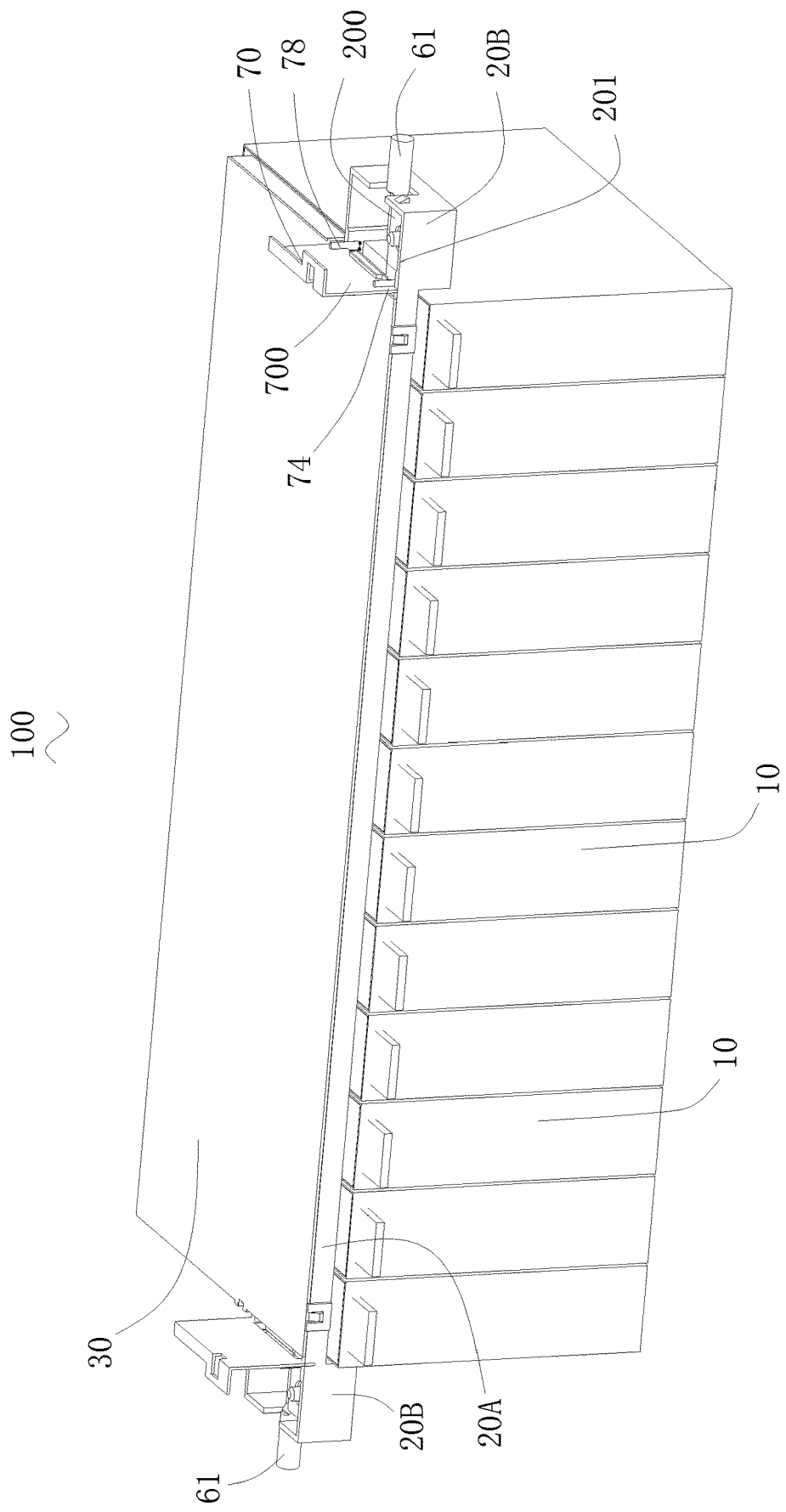
FIG. 12 is a schematic structural diagram with a second cover plate and a first cover plate of the battery module in FIG. 1 being perpendicular to each other.
Figure 13:
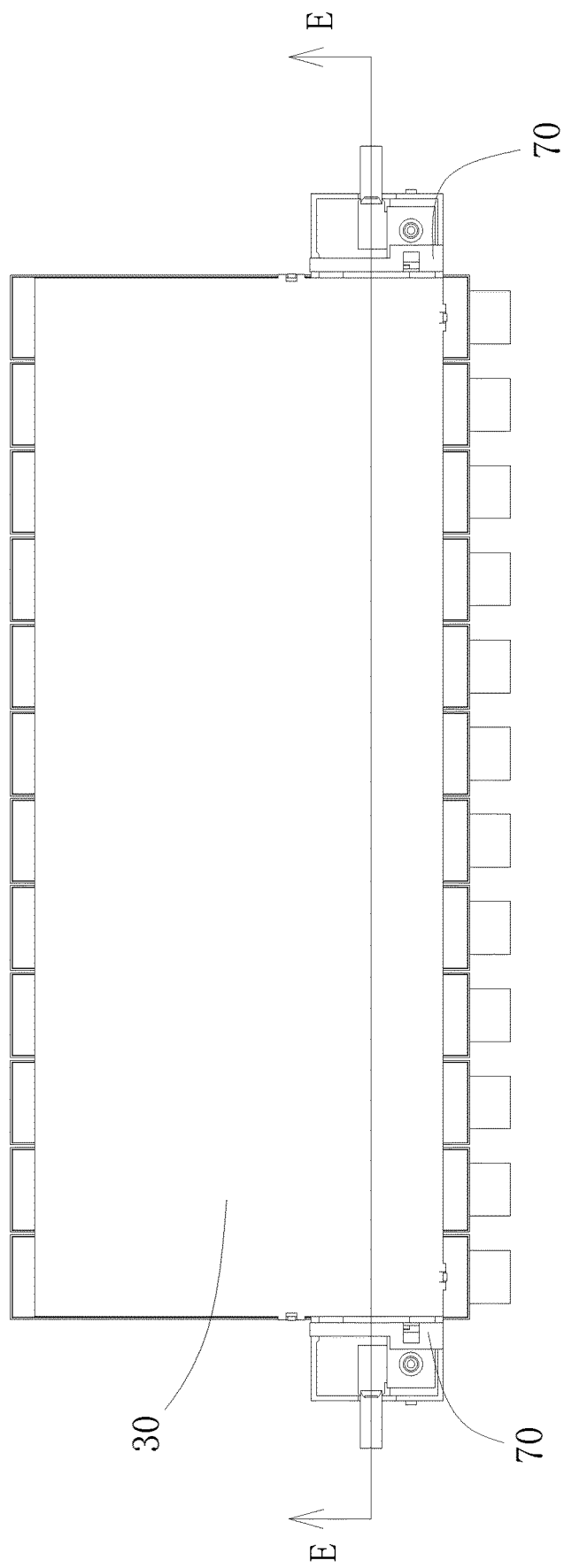
FIG. 13 is a top view of FIG. 12.
Figure 14:
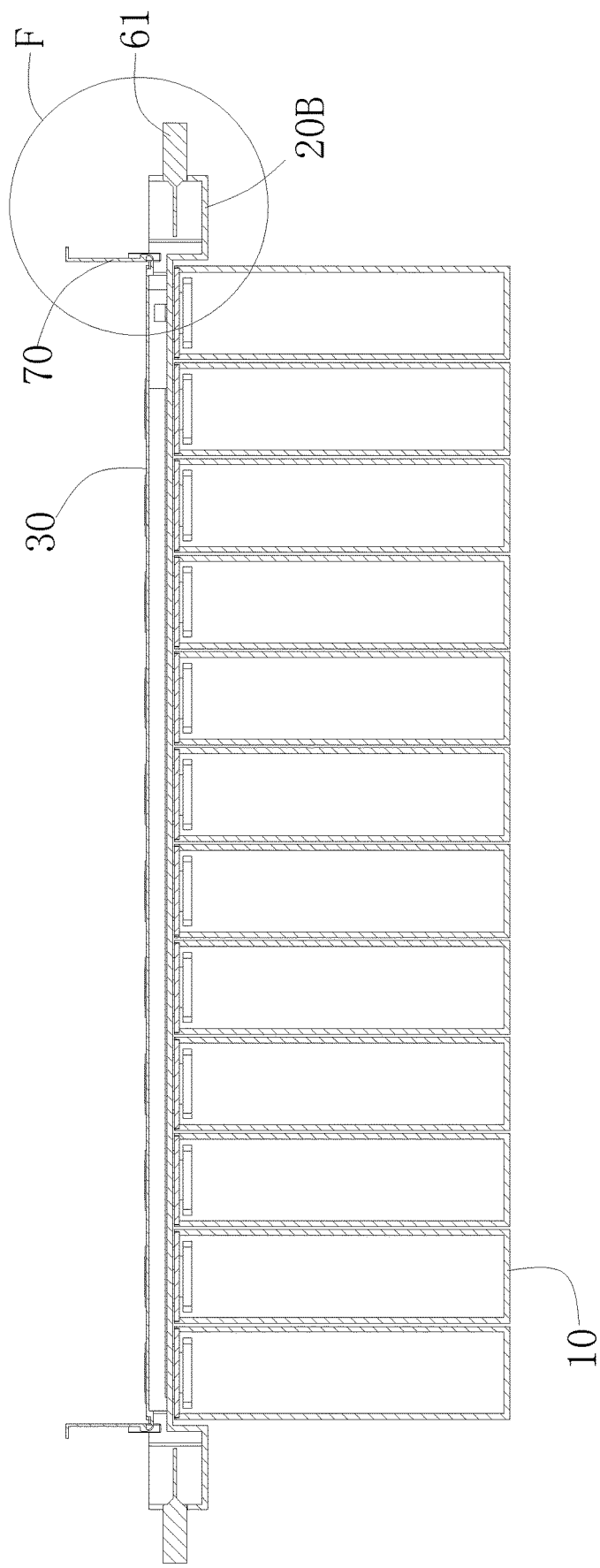
FIG. 14 is a sectional view taken along a direction E-E in FIG. 13.
Figure 15:
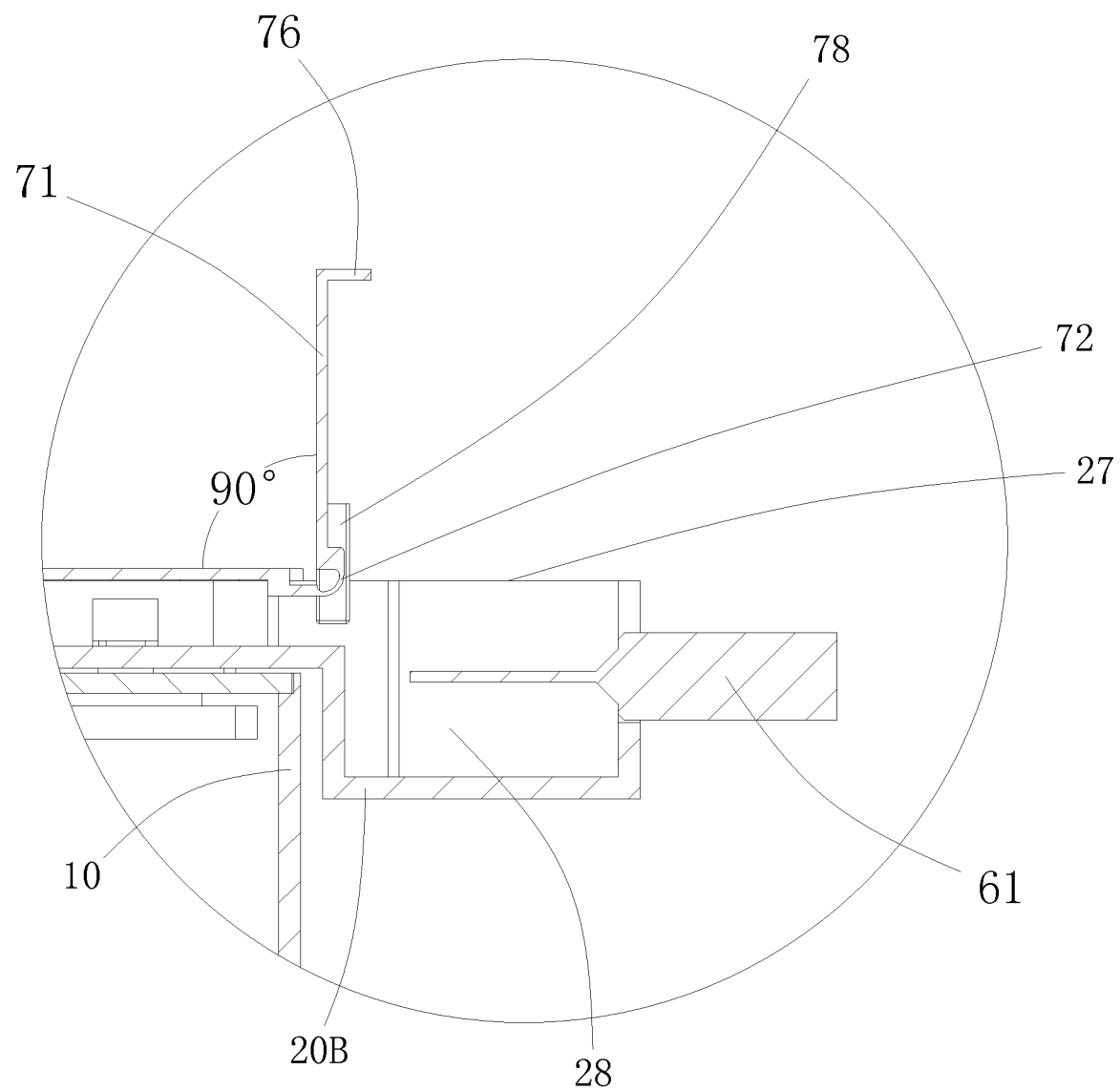
FIG. 15 is an enlarged schematic view at F in FIG. 14.

As shown in FIG. 11, when the second cover plate 70 is in the open position, the free end 75 of the extension 74 is arranged to extend beyond the bendable portion. When the second cover plate 70 is in the open position, the free end 75 of the extension 74 abuts against the protrusion 20B. In this case, an acute angle may be formed between the cover plate body 71 and the extension 74 and the first cover plate 30.

Referring to FIG. 12 to FIG. 15, during the movement of the second cover plate 70 from the closed position to the open position, the second cover plate 70 will rotates to be perpendicular to the first cover plate 30. In this case, the extension 74 abuts against the protrusion 20B, so that the bendable portion 72 is in a bent state. As shown in FIG. 8 to FIG. 11, the second cover plate 70 continues to rotate to the open position, and the second cover plate 70 will be turned over 90 degrees until the second cover plate 70 reaches the closed position. In this case, the free end 75 of the extension 74 abuts against the protrusion 20B, and the protrusion 20B forms a stop for the extension 74 to overcome the resilient force generated when the bendable portion 72 is elastically deformed, so that the second cover plate 70 is fixed in the open position. When not being pushed by an applied external force, the second cover plate 70 is stopped in the open position, and cannot be reset to the closed position under the resilient force of the bendable portion 72. The second cover plate 70 can be automatically reset to the closed position under the resilient force of the bendable portion 72 only when an external force is applied to push the second cover plate 70, for example, when the second cover plate 70 is rotated until an acute angle is formed between the second cover plate 70 and the first cover plate 30.

The second cover plate 70 is in the open position, and the conductive assembly can be electrically connected in the accommodation cavity 28. After the conductive assembly has been electrically connected in the accommodation cavity 28, an external force may be applied to the second cover plate 70, so that the second cover plate 70 is moved from the open position to the closed position, to enable the second cover plate 70 to at least partially cover the opening 27 so that the conductive assembly in the accommodation cavity 28 can be insulated.

To prevent the second cover plate 70 in the closed position from being detached from the protrusion 20B, the second cover plate 70 is detachably connected to the protrusion 20B. Preferably, as shown in FIG. 1, when the second cover plate 70 is in the closed position, the second cover plate 70 is connected to the protrusion 20B in a snap-fitted manner, such that the second cover plate 70 can be prevented from being detached from the housing 20. Preferably, as shown in FIG. 2 and FIG. 4, a first snap fastener 21 is arranged on an outer surface of the protrusion 20B. One side of the second cover plate 70 towards a thickness direction thereof is provided with a protruding snap-fit arm 76. The snap-fit arm 76 is provided with a second snap fastener 77. When the second cover plate 70 is in the open position, the second cover plate 70 is detached from the protrusion 20B, and the first snap fastener 21 is detached from and is not snap-fitted with the second snap fastener 77. When the second cover plate 70 is in the closed position, the snap-fit arm 76 is located on one side of the housing 20, the first snap fastener 21 is snap-fitted with the second snap fastener 77, and the first snap fastener 21 stops the second snap fastener 77, so that the second cover plate 70 can be prevented from being detached from the protrusion 20B.

The shape structure of the housing 20 may be specifically set as required. In this embodiment, as shown in FIG. 8, the protrusion 20B is provided with a bottom wall 200 and an annular side wall 201 arranged to protrude from the bottom wall 200. The bottom wall 200 and the annular side wall 201 define the accommodation cavity 28. One side of the annular side wall 201 is blocked by the bottom wall 200. The other side of the annular side wall 201 that is away from the bottom wall 200 is not blocked, and the opening 27 is formed on the other side. When the second cover plate 70 is in the closed position, the annular side wall 201 forms a stop for the free end 75 of the extension 74, and the second cover plate 70 at least partially covers the opening 27.

To prevent the second cover plate 70 in the closed position from shaking laterally on the housing 20, in this embodiment, as shown in FIG. 8, a retaining portion 78 is arranged to protrude from an inner surface 700 of the second cover plate 70. When the second cover plate 70 is in the closed position, the second cover plate 70 covers the opening 27, and the annular side wall 201 forms a lateral stop for the retaining portion 78 to prevent the second cover plate 70 from moving laterally.

In this embodiment, as shown in FIG. 2, the conductive assembly comprises a busbar 50. The busbar 50 is fixedly supported on the body 20A. The busbar 50 is electrically connected to the cells 10, and the plurality of cells 10 may be electrically connected in series or in parallel.

The conductive assembly further comprises a power supply terminal 60 and an external connection member 61. The external connection member 61 and the power supply terminal 60 are integrally formed as a single piece or are assembled and electrically connected together. The power supply terminal 60 is arranged in the accommodation cavity 28 and is electrically connected to the plurality of cells 10. The external connection member 61 extends out of the protrusion 20B for electrically connecting the battery module to supply power to the battery module.

For electrically connecting the power supply terminal 60 and the cells 10, the conductive assembly further comprises an electrical connection member 55. The power supply terminal 60 is electrically connected to the busbar 50 via the electrical connection member 55, so that the power supply terminal 60 is enabled to be electrically connected to the cells 10 via the electrical connection member 55 and the busbar 50. The electrical connection members 55 which electrically connects the power supply terminal 60 to the busbar 50 may have a plurality of specific structures. In an example, the electrical connection member 55 may comprise a conductive screw. The power supply terminal 60 and the busbar 50 may be sleeved over the conductive screw to enable an electrical connection.

The battery module 100 can charge and discharge to be repeatedly used. The battery module 100 may comprise a high voltage electrical signal. The connection assembly can insulate the conductive assembly comprising the power supply terminal 60, the busbar 50, and the like in the connection assembly. The battery module 100 in this embodiment may be applied to an electric vehicle for powering the electric vehicle.

In a housing for the battery module and the battery module provided in the embodiments of the present application, the housing 20 comprises a body 20A and a protrusion 20B extending continuously from the body 20A. The first cover plate 30 covers the body 20A of the housing 20. The second cover plate 70 is movably connected to the first cover plate 30 and can be switched between an open position and a closed position. In the open position, the second cover plate 70 is detached from the protrusion 20B of the housing 20, so that a conductive assembly can be electrically connected in the housing 20. In the closed position, the second cover plate 70 covers the protrusion 20B, so that the conductive assembly in the housing 20 can be insulated. The second cover plate 70 is arranged to be integrated with the first cover plate 30, so that the quantity of parts in the connection assembly and the battery module can be reduced. The second cover plate 70 is movable relative to the first cover plate 30 and can be conveniently switched between the closed position and the open position, so that the connection assembly and the battery module can be simply assembled and disassembled.

The foregoing is merely preferred embodiments of the present application and is not intended to limit the scope of the present application. Any modifications, equivalents or improvements within the spirit of the present application shall be encompassed within the scope of the claims of the present application.

What is claimed is:

1. A connection assembly for a battery module, comprising a housing, a first cover plate, and a second cover plate, wherein
    the housing comprises a body and a protrusion extending continuously from the body;
    the first cover plate covers the body;
    the second cover plate is arranged to be integrated with the first cover plate;
    the second cover plate is configured to be movable relative to the first cover plate so as to be switched between an open position and a closed position, the second cover plate has a cover plate body and an extension, the extension extending continuously from the cover plate body and protruding beyond the cover plate body to form a free end;
    in the closed position, the second cover plate covers the protrusion; and
    in the open position, the second cover plate is detached from the protrusion and the free end of the extension abuts against the protrusion to form a stop.

2. The connection assembly for a battery module according to claim 1, wherein
    the first cover plate is connected to the second cover plate via a bendable portion; and the bendable portion is configured to enable the second cover plate to rotate relative to the first cover plate.

3. The connection assembly for a battery module according to claim 2, wherein the bendable portion is bent and thus deformed, such that the second cover plate is moved from the closed position to the open position.

4. The connection assembly for a battery module according to claim 3, wherein the bendable portion is elastically deformed to generate a resilient force, so as to urge the second cover plate to move from the open position to the closed position.

5. The connection assembly for a battery module according to claim 2, wherein
the bendable portion is sheet-shaped, and
the bendable portion has a thickness smaller than that of the first cover plate.

6. The connection assembly for a battery module according to claim 2, wherein an obtuse angle is formed between the second cover plate in the open position and the second cover plate in the closed position.

7. The connection assembly for a battery module according to claim 2, wherein, in the open position, the free end of the extension is arranged to extend beyond the bendable portion.

8. The connection assembly for a battery module according to claim 2, wherein, during the rotation of the second cover plate from the closed position to the open position, when the second cover plate is perpendicular to the first cover plate, the extension abuts against the protrusion.

9. The connection assembly for a battery module according to claim 2, wherein
the protrusion is provided with a bottom wall and an annular side wall arranged to protrude from the bottom wall, the bottom wall and the annular side wall defines an accommodation cavity, and an opening is provided on one side of the accommodation cavity that is away from the bottom wall; and
in the closed position, the second cover plate at least partially covers the opening, and the annular side wall forms a stop for the extension.

10. The connection assembly for a battery module according to claim 9, wherein the second cover plate is rotatable from the open position to the closed position when pushed by an external force.

11. The connection assembly for a battery module according to claim 9, wherein
a retaining portion is arranged to protrude from an inner surface of the second cover plate; and
in the closed position, the second cover plate covers the opening, and the annular side wall forms a stop for the retaining portion to prevent the second cover plate from moving laterally.

12. The connection assembly for a battery module according to claim 2, wherein, in the closed position, the second cover plate is connected to the protrusion in a snap-fitted manner to prevent the second cover plate from being detached from the housing.

13. The connection assembly for a battery module according to claim 12, wherein
a first snap fastener is arranged on an outer surface of the protrusion;
the second cover plate is protrudingly provided with a snap-fit arm, and the snap-fit arm is provided with a second snap fastener;
in the open position, the first snap fastener is detached from the second snap fastener; and
in the closed position, the snap-fit arm is located on one side of the housing, and the first snap fastener is snap-fitted with the second snap fastener to prevent the second cover plate from being detached from the protrusion.

14. The connection assembly for a battery module according to claim 1, wherein the first cover plate and the second cover plate are integrally molded as a single piece.

15. A battery module, comprising:
a plurality of cells; and
the connection assembly of claim 1, wherein
the housing is arranged on the plurality of cells; and
the plurality of cells are electrically connected via the connection assembly to form the battery module.

16. The battery module according to claim 15, further comprising a conductive assembly, wherein
the conductive assembly is arranged in the housing;
the first cover plate covers a part of the conductive assembly in the body; and
the second cover plate covers the rest part of the conductive assembly in the protrusion.

17. The battery module according to claim 16, wherein
the protrusion is provided with an accommodation cavity;
in the open position, the second cover plate is detached from the protrusion and the accommodation cavity is opened; and
in the closed position, the second cover plate covers the protrusion and covers the accommodation cavity.

18. The battery module according to claim 16, wherein
the conductive assembly comprises a busbar, the busbar being fixedly supported on the body; and
the busbar is electrically connected to the cells.

19. The battery module according to claim 18, wherein
the conductive assembly comprises a power supply terminal and an external connection member;
the protrusion is provided with an accommodation cavity;
the power supply terminal is arranged in the accommodation cavity and is electrically connected to the plurality of cells; and
the external connection member extends out of the protrusion for electrically connecting the battery module.

20. The battery module according to claim 19, wherein the conductive assembly further comprises an electrical connection member; and
the power supply terminal is electrically connected to the busbar via the electrical connection member.

21. The battery module according to claim 15, wherein the battery module is a battery module for use in an electric vehicle.

* * * * *